March 19, 1940.    F. O. ALBERTSON ET AL    2,194,062
VALVE SEAT GRINDING MACHINE
Filed Feb. 28, 1938    3 Sheets-Sheet 1
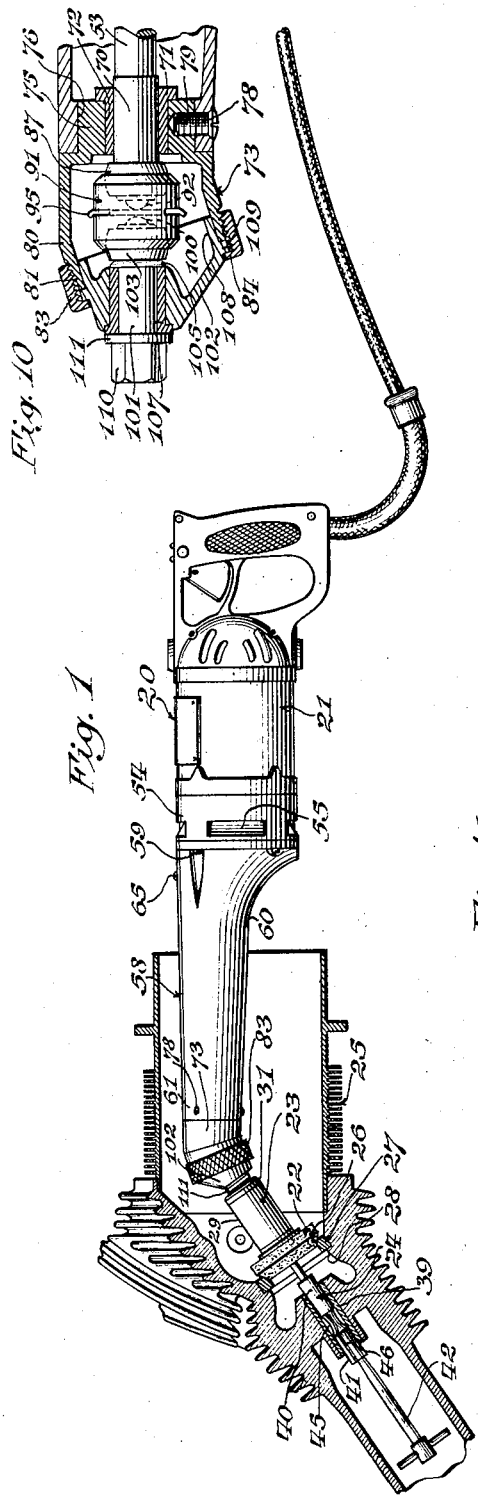
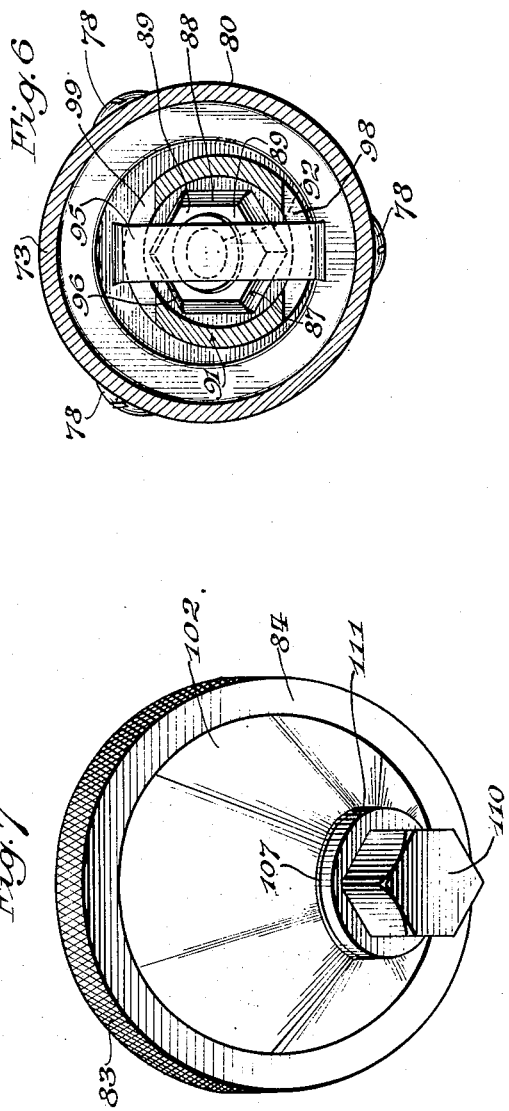
Inventors:
Frans O. Albertson
Harold Edgar Dowling
By Williams, Bradbury
McCaleb & Hinkle
Attys.

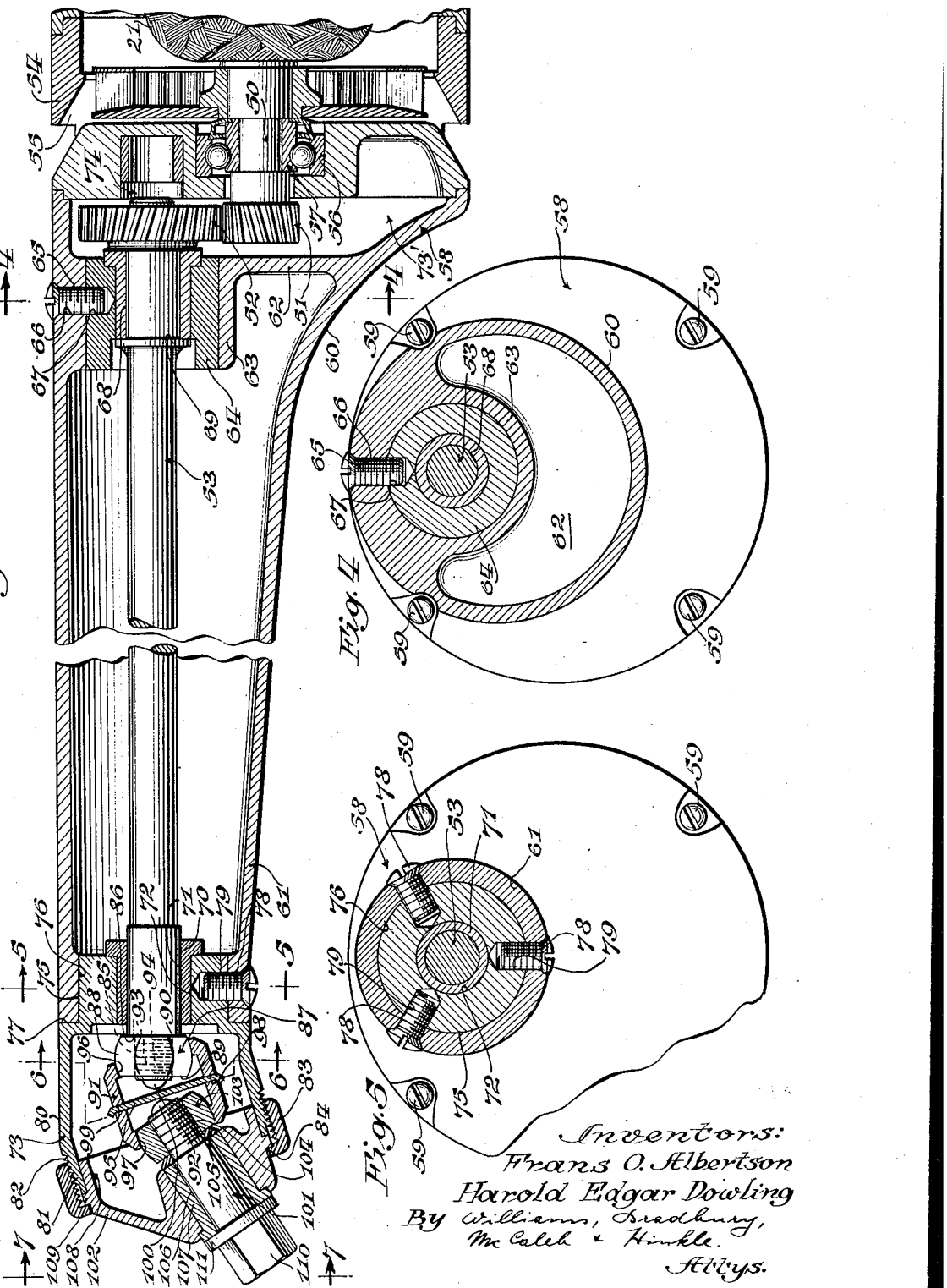

March 19, 1940. F. O. ALBERTSON ET AL 2,194,062
VALVE SEAT GRINDING MACHINE
Filed Feb. 28, 1938  3 Sheets-Sheet 3
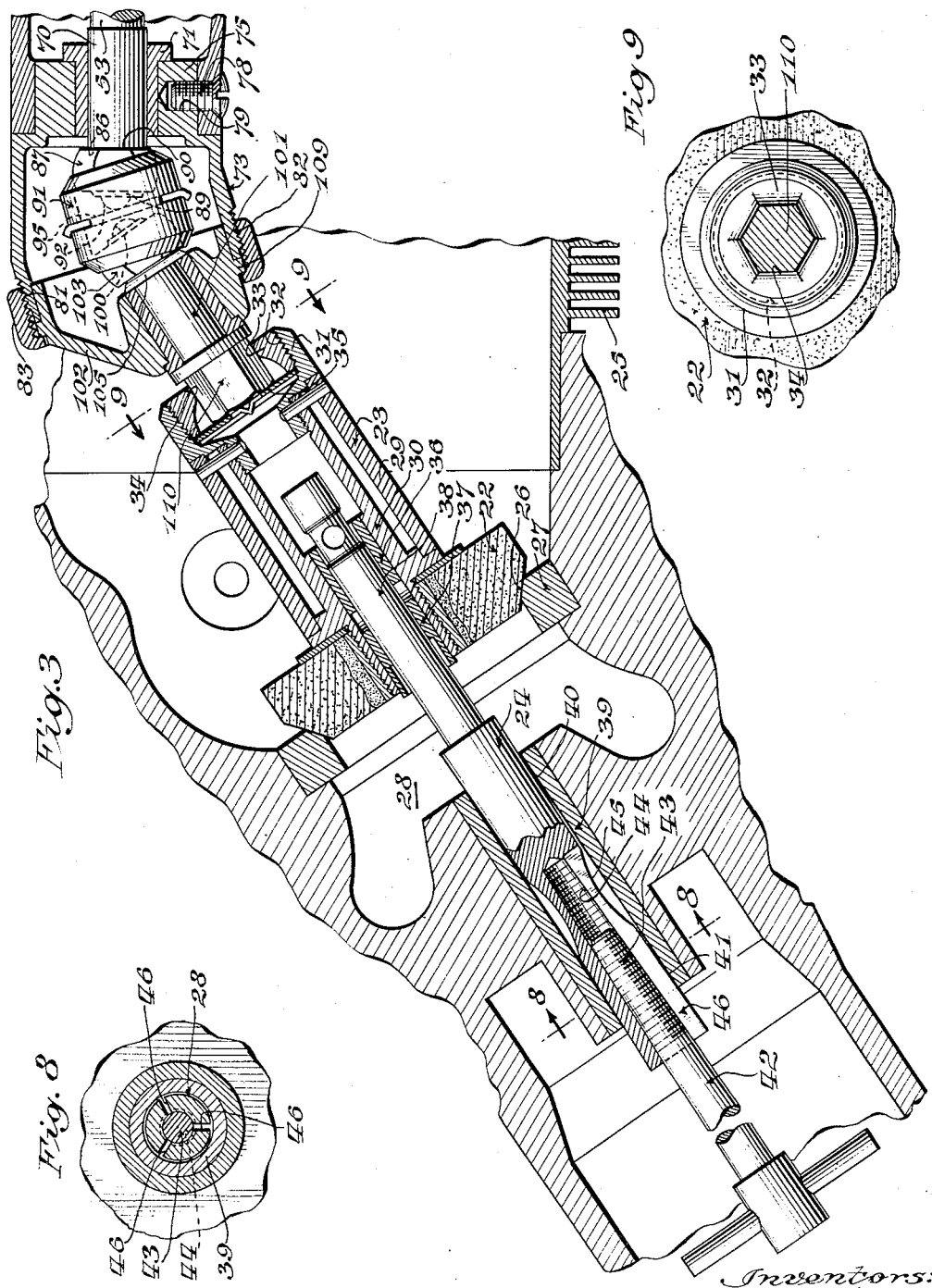
Inventors:
Frans O. Albertson
Harold Edgar Dowling
By Williams, Bradbury, McCaleb & Hinkle
Attys.

Patented Mar. 19, 1940

2,194,062

UNITED STATES PATENT OFFICE 2,194,062

VALVE SEAT GRINDING MACHINE

Frans O. Albertson and Harold Edgar Dowling, Sioux City, Iowa, assignors to Albertson & Company, Inc., Sioux City, Iowa, a corporation of Iowa Application February 28, 1938, Serial No. 192,899

5 Claims. (Cl. 51—241)

The present invention relates to valve seat grinders, and is particularly concerned with valve seat grinders adapted to be used with aircraft engines where the valve seats are particularly inaccessible.

One of the objects of the present invention is the provision of an improved valve seat grinder adapted to be used with aircraft engines in which the valves are only accessible from inside of a cylinder and in which the valve seats are frequently disposed at an angle to the axis of the cylinder.

Another object of the invention is the provision of a valve seat grinder of the class described which is provided with means for permitting the adjustment of the drive shaft to any of a multiplicity of different angles so that the drive shaft may be brought into driving relation with a grinder which is at any predetermined angle with respect to the axis of the motor driver.

Another object is the provision of a valve seat grinder which is an improvement over our prior Patents No. 2,042,759 of June 2, 1936, Valve seat grinding machine, and 2,005,851 of June 25, 1935, Valve seat grinder, as well as No. 1,989,905 of February 5, 1935.

Another object of the invention is the provision of an improved valve seat grinder for aircraft engines which is adapted to carry out the method of dressing valve seats as described in the last-mentioned Albertson Patent No. 1,989,905.

Another object is the provision of an improved valve seat grinder which is durable, capable of being used in various otherwise inaccessible places, and which is adapted to be constructed at a minimum cost, considering the objects to be attained thereby.

Other objects and advantages will be apparent from the following description and the accompanying drawings, in which similar characters of reference indicate similar parts throughout the several views.

Referring to the drawings, of which there are three sheets,

Fig. 1 is an elevational view of a valve seat grinder constructed according to the present invention, shown in position to grind the valve of an aircraft engine;

Fig. 2 is a medial sectional view taken on a plane passing through the axis of the shaft of the motor driver, with the axis of the drive shaft so disposed that its axis comes in the same plane;

Fig. 3 is an enlarged fragmentary sectional view taken on the same plane as that of Fig. 2, with the details of the grinder shown in section;

Fig. 4 is a sectional view taken on the plane of the line 4—4 of Fig. 2, looking in the direction of the arrows;

Fig. 5 is a sectional view taken on the plane of the line 5—5 of Fig. 2;

Fig. 6 is a sectional view taken on the plane of the line 6—6 of Fig. 2, looking in the direction of the arrows;

Fig. 7 is a double sized end elevational view of the driver;

Fig. 8 is a sectional view taken on the plane of the line 8—8 of Fig. 3, looking in the direction of the arrows;

Fig. 9 is a sectional view taken on the plane of the line 9—9 of Fig. 3, looking in the direction of the arrows;

Fig. 10 is a view similar to Fig. 2, with the drive shaft disposed at a different angle from that of Fig. 2, and specifically with the drive shaft in such a position that it is parallel with respect to the motor shaft.

Referring to Fig. 1, 20 indicates in its entirety the valve seat grinder assembly, which consists of a driving motor 21, a grinding wheel 22 carried by a tool holder 23, and a pilot 24. The valve seat grinder is shown in connection with a part of an aircraft engine 25, in which the valve seat 26 is formed on a ring 27 of hardened material, such as, for example, "Stellite," which is disposed in a complementary recess in the valve opening 28.

The grinding wheel 22 and tool holder 23 are preferably of the same construction as that disclosed in our prior Patent No. 1,989,905, and indicated therein by the numeral 21. This tool holder comprises a housing 29 which is carried by a metal sleeve 30 having the grinding wheel 22 secured to its lower end. At its upper end the sleeve 30 carries a socket member 31 which is provided with a threaded bore 32 for receiving a collar 33, the collar 33 having a hexagonal opening 34.

The collar 33 secures in the threaded bore 32 a resilient steel diaphragm 35 against which the end of the drive shaft 101 abuts. The sleeve 30 also contains a pair of spaced steel sleeves 36, 37, adapted to slidably and rotatably engage the hardened steel cylindrical end 38 of the pilot 28. Thus the grinding wheel 22 is supported on the pilot 28 for sliding movement, toward or from the seat, and for rotation with respect to the seat.

The pilot 24 is of a particular construction for the reason that the valve seat guides 39 of these engines are also inaccessible.

The pilot 24 comprises a hardened steel member which is provided with an upper tapered surface 40 adapted to be wedged into the upper end of the valve stem guide 39, and with a lower cylindrical surface 41, which will pass through the valve stem guide 39, but which is adapted to be spread by a spreader 42.

The spreader 42 has a tapered and threaded end 43, which is disposed in a threaded and tapered bore 44. The pilot is made thinner at 45 to increase its resiliency, and it is provided with two or more slots 46, so that the cylindrical end 41 may be spread into engagement with the valve stem guide 39 by the spreader 42. Thus the pilot 28 may be fixedly secured in the valve stem guide in centered position for the purpose of centering and guiding the grinding wheel.

Referring to Figs. 1 and 2, the motor preferably used in the driver may be of the same construction as disclosed in our prior Patent No. 1,989,905, the motor shaft 50 being provided with a suitable pinion 51 for engaging the gear 52 on an elongated shaft 53.

The motor housing is closed by an end cover 54, which has ventilating openings 55 and has a socket 56 for supporting the anti-friction bearing 57. The cover 54 supports a shaft housing 58, which is secured to the motor by the same screw bolts 59 which secure the cover 54 to the motor housing. The shaft housing 58 is circular at the upper end (Fig. 2), tapering at an intermediate portion 60, down to a smaller cylindrical end 61.

At the larger end the shaft housing is provided with a partition web 62, which has formed integrally with it a bearing sleeve 63 for receiving the bearing 64 which is secured in place by a screw bolt 65 extending through the bore 66 and threaded into the bore 67 in the bearing 64.

The shaft 53 is provided with a cylindrical portion 68, which is rotatably mounted in the bearing 64, and with an annular thrust shoulder 69 engaging the end of that bearing. The gear 52 may be fixedly mounted on the shaft 53 in any convenient manner. For example, the gear 52 and shaft 53 may be provided with an appropriate key, and the gear may float within the chamber 73', or the shaft may be provided with a threaded end and a nut in the recess 74.

At the lower end of the shaft 53 (Fig. 2) it is provided with a cylindrical journal portion 70, which is rotatably mounted in a bearing sleeve 71. The bearing sleeve 71 is carried in a bore 72 in the end of the driver head 73. The smaller cylindrical end of the shaft housing 58 is adapted to support the driver head 73. For this purpose the driver head 73 is formed with a reduced cylindrical portion 75 fitting in the bore 76, and with an annular shoulder 77 engaging the end of the shaft housing 58.

A screw bolt 78 passes through a hole in the shaft housing, and is threaded into a bore 79 in the reduced cylindrical end 75 of the driver head.

The driver head comprises a hollow member or sleeve having a pair of cylindrical portions 80 and 81, which are disposed at a slight angle to each other, such as, for example, the angle shown in Fig. 2.

The cylindrical portion 81 is threaded at 82 to receive a threaded cap sleeve 83, which has an inwardly extending annular flange 84. The lowermost end of the shaft 53 (Fig. 2) is provided with a reduced threaded portion 85 and an annular shoulder 86. This threaded portion supports a knob member 87, which forms a part of a universal joint, and which is constructed of specially hardened steel and ground to exact predetermined shape.

The knob member 87 is hexagonal when viewed from the end, but its six side surfaces 88, which are all similar in shape, are curved from front to back with a partially cylindrical curvature, the axis of the cylinder being located at the axis of the shaft 53, and midway between the front 89 and the back 90 of the knob. Thus the hexagonal knob has a front to back curvature, which permits a universal movement of the drive sleeve 91 on this knob.

The knob has an inner bore which is threaded complementarily to the threads 85 and in a right hand direction so that the rotation of the shaft 53 in a right hand direction drives the knob home against the annular shoulder 86. Thus the knob will never be loosened by the rotation of the driver, which is always in the same direction.

The reduced cylindrical end 85 of shaft 53 is also preferably provided with a hardened steel ball-shaped member 92, which may be carried by a threaded stud 93 and secured by threading into a complementary bore 94 in the reduced end 85.

The ball-shaped end 92 is adapted to take the thrust which is placed on the end of the shaft 53 and is adapted to effect sliding movement with a resilient steel diaphragm spring 95 carried by the sleeve 91, with a minimum amount of friction.

The sleeve 91 forms a part of a universal joint, and it comprises a hardened steel member of cylindrical shape, each end of which is provided with a hexagonal opening 96, 97. Both ends of the driving sleeve 91 are identical in construction. Midway between the ends of the driving sleeve 91 the sleeve is formed with a pair of transverse and oppositely located slots 98, 99, within which there is secured the resilient strip of steel 95 by having both ends riveted over outside of the slots 98, 99.

The strip of steel 95 may be termed a diaphragm, and it extends diametrically across the sleeve 91 and is of sufficient width to engage the ball-shaped formation 92, and another similar ball-shaped formation 100 on the opposite side.

The motor driver is provided with a drive shaft 101 which is carried by an angular cap member 102 and which has a knob 103 which is similarly shaped to the knob 87, previously described. Knob 103 is secured to drive shaft 101 in the same manner as knob 87 is secured on the shaft 53; that is, by means of a reduced threaded portion 104. A washer 105 having an upper round surface is disposed on the reduced threaded portion 104, serving as a thrust bearing, and spacing the knob slightly from its bearing to give a greater freedom of action.

The cylindrical portion 106 of the drive shaft 101 is rotatably mounted in a bearing sleeve 107 which fits in a bore in the angular cap 102. The bearing sleeve 107 and its bore are disposed at an angle to the axis of the body of the cap 102; that is, at an angle to the cylindrical portion 108 which fits in the end 81 of the driver head 73.

The cap member 102 has an annular outwardly projecting flange 109 which engages the end of the head 73 and is secured beneath the inwardly extending flange 84 on the sleeve 83. When the sleeve 83 is loosened on its threads, the angular cap member 102 may be rotated on the head 73.

The drive shaft 101 likewise has a hardened steel ball shaped member 100 at its inner end for engaging the diaphragm 95.

The angularity of the drive shaft 101 with regard to the supporting cylindrical portion 108 of the cap 102 may be the same as the angularity of the end portion 81 of the driver head 73 with respect to the supporting portion 80 or 75. Thus these two angularities may be made to add up by turning the cap 102 to the position of Fig. 2, or the two angularities may be made to subtract from each other by turning the cap 102 to the position of Fig. 10.

In Fig. 10 these two angularities counteract each other, and the drive shaft 101 is substantially parallel or axial with respect to the shaft 53, and parallel to the shaft of the motor. Any intermediate angular positions may also be attained by rotating the angular cap 102. The cap is, of course, secured in place by driving the sleeve 83 home and clamping the flange 109 in any position desired.

The drive shaft 101 is provided with a hexagonal end 110 and an outwardly projecting annular flange 111, serving as a thrust bearing for engaging the end of the bearing sleeve 107.

The hexagonal end 110 fits in the socket 34 of the tool holder 23 with a substantial clearance so that the hexagonal end 110 (Fig. 3) may be disposed at various small angles with respect to the diaphragm 35 and with respect to the axis of the tool holder 23. This angular position of the hexagonal end 110 causes the extreme end of the drive shaft 110 to strike the diaphragm 35 periodically as each corner of the hexagonal end 110 comes down into engagement with the diaphragm 35. This produces a periodic axial vibration of the tool holder 23 and driving wheel 22.

The operation of the motor driver is otherwise quite simple, as the motor shaft 50 drives pinion 51, which drives gear 52, which rotates the shaft 53 at a greater speed than the motor shaft 50. The shaft 53 by means of its knob 87 drives the sleeve 91, which floats within the chamber head 73, and sleeve 91 drives the knob 103, which drives the shaft 101.

The present grinder driver is thus adapted to effect a driving of a tool cutter with the drive shaft of the driver disposed in any of a plurality of different positions. This not only permits the user to arrange the drive shaft on the driver so that it can be used in an otherwise inaccessible position, but it permits the user to effect an oscillation of the drive shaft about the axis of that drive shaft by merely rotating the motor about the axis of the motor. In other words, the structure of this motor driver permits the carrying out of the method by a slightly different manipulation of the motor, which does not require the oscillation of the motor itself back and forth from the left to the right, but merely requires rotation of the motor.

This permits the method to be carried out with the present apparatus in more restricted places.

The operation of this grinder is substantially the same as the one described in my Patent No. 1,989,905, referred to above. For example, with a motor rotating at 10,000 R.P.M., no load, the grinding stone and tool holder may rotate at approximately 13,000 R.P.M., under load, and the handle of the motor may be oscillated back and forth, or its drive shaft 105 may be caused to oscillate by merely twisting the motor about the main axis of the motor in Fig. 1.

This twisting motion of the motor changes the angle at which the driving end 110 of the shaft 101 engages in the socket 34 of the tool holder 23 against the diaphragm 35.

In brief, the grinding stone is then rotated in full contact with the valve seat, but the grinding stone is subjected to periodic axial vibrations caused by the engagement of the hexagonal end 110 of the drive shaft with the diaphragm 35 when the hexagonal end is disposed at an angle. These periodic vibrations in an axial direction vary the pressure and/or area of contact of the stone in such manner as they constantly disperse the cuttings and prevent the clogging or loading of the stone. This high frequency vibration effect results in a dispersion of the cuttings and produces a mirror-like seat without any substantial effect on the grinding stone.

It will thus be observed that I have invented an improved valve seat grinding machine which is peculiarly adapted to be utilized for grinding the valves of aircraft engines. The grinder driver has a head which permits the drive shaft to be disposed at any of a plurality of different angles or in a position axially with respect to the driving motor.

When the drive shaft is disposed at an angle to the driving motor, it is possible to vary the angularity of that drive shaft momentarily by merely rotating the motor with the wrist, and thus the periodic axial impulses may be given to the tool holder and grinding stone, which result in the dispersion of the cuttings.

The present grinder driver is thus adapted to carry out the method of my prior patent in a more restricted space, as it does not require bodily oscillation of the motor driver back and forth upon a center which is located at the end of the drive shaft, but it merely requires rotation of the motor itself upon its own axis periodically to effect the same result.

The present grinding machine assembly may be utilized in many positions where the valves would not be at all accessible to the devices of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a valve seat grinding machine, the combination of a pilot to be fixedly secured in a valve stem guide, with a tool holder slidably and rotatably mounted on said pilot and carrying a grinding stone, said tool holder having a non-circular socket in its driving end, provided with a resilient diaphragm, and a motor driver, said motor driver having its drive shaft disposed at an angle with respect to the axis of the motor, the drive shaft having a non-circular end adapted to be inserted in said socket, whereby the grinding stone may be rotated and subjected to a multiplicity of periodic axial vibrations for the purpose of effecting a grinding of the seat and a dispersion of the cuttings, said motor driver including a shaft housing having bearings for a main shaft, a cap rotatably mounted on said shaft housing and having a bearing with its axis at an angle to the axis of rotation of said cap, means for securing said cap in any of a plurality of rotative positions, comprising a sleeve having threaded engagement with said housing, and a universal connection between said main shaft and drive shaft whereby the pilot may be disposed at various angles with respect to the angle of the main shaft.

2. In a motor driver for valve seat grinders, the combination of an elongated housing having bearings for a main shaft, with a main shaft rotatably mounted in said bearings, said main shaft having a non-circular driving formation at its end, a housing extension having its axis extending at an angle to the axis of said main shaft, a cap rotatably mounted on the end of said housing extension, and having a bearing in said cap, a drive shaft in said cap bearing, and having a non-circular driving formation on its inner end, and a universal drive connection between the end of said main shaft and said drive shaft, said connection comprising a sleeve having non-circular sockets complementary in shape to the ends of said shafts.

3. In a motor driver for valve seat grinders, the combination of an elongated housing having bearings for a main shaft, with a main shaft rotatably mounted in said bearings, said main shaft having a non-circular driving formation at its end, a housing extension having its axis extending at an angle to the axis of said main shaft, a cap rotatably mounted on the end of said housing extension, and having a bearing in said cap, a drive shaft in said cap bearing, and having a non-circular driving formation on its inner end, and a universal drive connection between the end of said main shaft and said drive shaft, said connection comprising a sleeve having non-circular sockets complementary in shape to the ends of said shafts, said cap bearing being located at an angle to the axis of rotation of the cap, and means for clamping said cap in a plurality of rotative positions on said housing extension.

4. In a motor driver for valve seat grinders, the combination of an elongated housing having bearings for a main shaft, with a main shaft rotatably mounted in said bearings, said main shaft having a non-circular driving formation at its end, a housing extension having its axis extending at an angle to the axis of said main shaft, a cap rotatably mounted on the end of said housing extension, and having a bearing in said cap, a drive shaft in said cap bearing, and having a non-circular driving formation on its inner end, and a universal drive connection between the end of said main shaft and said drive shaft, said connection comprising a sleeve having non-circular sockets complementary in shape to the ends of said shafts, said cap bearing being located at an angle to the axis of rotation of the cap, and means for clamping said cap in a plurality of rotative positions on said housing extension, said non-circular ends comprising members threaded on said shafts and having a regular polygonal form in end elevation, said members having their surfaces formed with a circular profile from end to end for rotative movement on an axis transverse to the axis of said sleeve in the sockets of said sleeve.

5. A motor driver for valve seat grinders, comprising a motor having a motor shaft, said motor shaft having a pinion, an end cover for said motor, having a bearing for said motor shaft, and having a second bearing for a driven shaft, a shaft housing carried by said end cover, and having bearings for a driven shaft, an elongated shaft rotatably mounted in said shaft housing, and having a gear engaging said pinion, a cap rotatably mounted on said shaft housing, and having a bearing extending with its axis at an angle to the axis of rotation of said cap, a drive shaft rotatably mounted in said bearing, means comprising a threaded sleeve having threaded engagement with the end of said housing for clamping said sleeve in a plurality of different rotative positions, and a universal driving connection between the ends of said driven shaft and said drive shaft, whereby the driver may be used to drive valve seat grinders disposed at an angle in relatively deep parts of an engine.

FRANS O. ALBERTSON.
HAROLD EDGAR DOWLING.